United States Patent
Guo et al.

(10) Patent No.: US 10,264,081 B2
(45) Date of Patent: Apr. 16, 2019

(54) CONTEXTUAL PEOPLE RECOMMENDATIONS

(71) Applicant: Microsoft Technology Licensing, LLC, Redmond, WA (US)

(72) Inventors: Chenlei Guo, Redmond, WA (US); Jianfeng Gao, Woodinville, WA (US); Xinying Song, Bellevue, WA (US); Byungki Byun, Issaquah, WA (US); Yelong Shen, Bothell, WA (US); Ye-Yi Wang, Redmond, WA (US); Brian D. Remick, Morgan Hill, CA (US); Edward Thiele, Mountain View, CA (US); Mohammed Aatif Ali, Union City, CA (US); Marcus Gois, San Jose, CA (US); Xiaodong He, Sammamish, WA (US); Jianshu Chen, Redmond, WA (US); Divya Jetley, Bellevue, WA (US); Stephen Friesen, Dublin, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 508 days.

(21) Appl. No.: 14/806,281

(22) Filed: Jul. 22, 2015

(65) Prior Publication Data

US 2016/0323398 A1 Nov. 3, 2016

Related U.S. Application Data

(60) Provisional application No. 62/154,039, filed on Apr. 28, 2015, provisional application No. 62/156,362, filed on May 4, 2015.

(51) Int. Cl.
*H04L 29/08* (2006.01)
*G06F 17/30* (2006.01)
(Continued)

(52) U.S. Cl.
CPC .......... *H04L 67/22* (2013.01); *G06F 17/3053* (2013.01); *G06F 17/30699* (2013.01);
(Continued)

(58) Field of Classification Search
CPC ....... H04L 67/22; H04L 67/306; H04L 51/20; G06F 17/30699; G06F 17/3053;
(Continued)

(56) References Cited

U.S. PATENT DOCUMENTS

| 7,774,421 B2 | 8/2010 | Dubovsky et al. |
| 8,090,781 B2 | 1/2012 | Sano |

(Continued)

OTHER PUBLICATIONS

"Second Written Opinion Issued in PCT Application No. PCT/US2016/029404", dated Mar. 27, 2017, 7 Pages.

(Continued)

*Primary Examiner* — Chris Parry
*Assistant Examiner* — Soe M Hlaing
(74) *Attorney, Agent, or Firm* — Law Offices of Richard Chi; Richard Chi

(57) ABSTRACT

Techniques for providing a people recommendation system for predicting and recommending relevant people (or other entities) to include in a conversation based on contextual indicators. In an exemplary embodiment, email recipient recommendations may be suggested based on contextual signals, e.g., project names, body text, existing recipients, current date and time, etc. In an aspect, a plurality of properties including ranked key phrases are associated with profiles corresponding to personal entities. Aggregated profiles are analyzed using first- and second-layer processing techniques. The recommendations may be provided to the user reactively, e.g., in response to a specific query by the user to the people recommendation system, or proactively, (Continued)

e.g., based on the context of what the user is currently working on, in the absence of a specific query by the user.

20 Claims, 14 Drawing Sheets

(51) Int. Cl.
*G06N 99/00* (2010.01)
*H04L 12/58* (2006.01)
*G06Q 10/06* (2012.01)

(52) U.S. Cl.
CPC ..... *G06N 99/005* (2013.01); *G06Q 10/06311* (2013.01); *G06Q 10/06313* (2013.01); *G06Q 10/06315* (2013.01); *H04L 51/20* (2013.01); *H04L 67/306* (2013.01)

(58) Field of Classification Search
CPC ........... G06N 99/005; G06Q 10/06313; G06Q 10/06315; G06Q 10/06311
See application file for complete search history.

(56) References Cited

U.S. PATENT DOCUMENTS

| | | |
|---|---|---|
| 8,301,704 B2 | 10/2012 | Gross |
| 8,306,809 B2 | 11/2012 | Hammer et al. |
| 8,423,545 B2 | 4/2013 | Cort et al. |
| 8,489,626 B2 | 7/2013 | Li et al. |
| 8,606,242 B2 | 12/2013 | Kedefors et al. |
| 8,677,251 B2 | 3/2014 | Kwok et al. |
| 8,738,634 B1 | 5/2014 | Roth |
| 8,892,672 B1 | 11/2014 | Rackliffe |
| 8,990,191 B1 | 3/2015 | Liu |
| 9,594,851 B1 | 3/2017 | Chechik |
| 2007/0130368 A1 | 6/2007 | Martin et al. |
| 2008/0114846 A1* | 5/2008 | Sano ............... G06Q 10/107 709/206 |
| 2009/0037413 A1 | 2/2009 | Castell et al. |
| 2009/0100183 A1 | 4/2009 | Lam et al. |
| 2009/0119234 A1 | 5/2009 | Pinckney et al. |
| 2009/0282039 A1 | 11/2009 | Diamond |
| 2012/0088561 A1 | 4/2012 | Hohmann et al. |
| 2012/0183935 A1 | 7/2012 | Hamada |
| 2012/0197899 A1* | 8/2012 | Li ............... G06F 17/30722 707/741 |
| 2013/0204809 A1 | 8/2013 | Bilenko |
| 2013/0275429 A1 | 10/2013 | York et al. |
| 2013/0290291 A1 | 10/2013 | Loofbourrow et al. |
| 2014/0214976 A1 | 7/2014 | Zhou et al. |
| 2014/0222792 A1 | 8/2014 | Groeneveld et al. |
| 2014/0222815 A1 | 8/2014 | Roth |
| 2014/0289258 A1* | 9/2014 | Joshi ............... G06Q 10/107 707/741 |
| 2015/0058380 A1* | 2/2015 | Polonsky ............ H04L 67/306 707/812 |
| 2015/0112182 A1 | 4/2015 | Sharma |
| 2016/0048741 A1 | 2/2016 | Nguyen |
| 2016/0062984 A1* | 3/2016 | Caliendo, Jr. ......... G06F 3/0488 704/9 |
| 2016/0098633 A1 | 4/2016 | Min |
| 2016/0106321 A1 | 4/2016 | Sharma et al. |
| 2016/0189730 A1 | 6/2016 | Du |
| 2016/0283859 A1 | 9/2016 | Fenoglio |
| 2016/0321283 A1 | 11/2016 | Shen et al. |

OTHER PUBLICATIONS

"International Search Report and Written Opinion Issued in PCT Application No. PCT/US2016/029404", dated Jun. 20, 2016, 11 Pages.

Minkov, et al., "Contextual Search and Name Disambiguation in Email Using Graphs", In Proceedings of the 29th annual international ACM SIGIR conference on Research and development in information retrieval, Aug. 6, 2006, pp. 27-34.

Minkov, et al., "Improving Graph-Walk-Based Similarity with Reranking: Case Studies for Personal Information Management", In Proceedings of ACM Transactions on Information Systems, vol. 29, No. 1, Article 4, Dec. 2010, 52 pages.

Carmel, et al., "Personalized Social Search Based on the User's Social Network", In Proceedings of the 18th ACM conference on Information and knowledge management, Nov. 2, 2009, pp. 1227-1236.

"Overview of search result ranking in SharePoint Server 2013", Retrieved on: Apr. 21, 2015 Available at: https://technet.microsoft.com/en-IN/library/dn169065.aspx.

Dredze, et al., "Suggesting Email View Filters for Triage and Search", In Proceedings of the 21st International Joint Conference on Artificial Intelligence, Jul. 11, 2009, 6 pages.

Guy, et al., "Public vs. Private—Comparing Public Social Network Information with Email", In Proceedings of the ACM Conference on Computer Supported Cooperative Work, Nov. 8, 2008, pp. 393-402.

Perer, et al., "Visual Social Network Analytics for Relationship Discovery in the Enterprise", In Proceedings of IEEE Conference on Visual Analytics Science and Technology, Oct. 23, 2011, pp. 71-79.

Li, et al., "Context-based People Search in Labeled Social Networks", In Proceedings of the 20th ACM International Conference on Information and Knowledge Management, Oct. 24, 2011, pp. 1607-1612.

"Non Final Office Action Issued in U.S. Appl. No. 14/811,397", dated Sep. 29, 2017, 20 Pages.

Carvalho, et al., "Recommending Recipients in the Enron Email Corpus", In Technical Report CMU-LTI-07-005, Jun. 7, 2010, 10 Pages.

Gomzin, "Recipient Suggestion for Electronic Messages Using Local Social Network Data", In Proceedings of Tenth Spring Researchers Colloquium on Databases and Information Systems, Nov. 2014, 7 Pages.

Guo, et al., "GroupMe: Supporting Group Formation with Mobile Sensing and Social Graph Mining"; In Proceedings of 9th International Conference on Mobile and Ubiquitous Systems: Computing, Networking and Services, Dec. 12, 2012, 12 Pages.

Maclean, et al., "Groups Without Tears: Mining Social Topologies from Email", In Proceedings of 16th International Conference on Intelligent User Interfaces, Feb. 13, 2011, 10 Pages.

"International Search Report and Written Opinion issued in PCT Application No. PCT/US2016/029408", dated Jun. 21, 2016, 11 Pages.

"Second Written Opinion Issued in PCT Application No, PCT/US2016/029408", dated Mar. 16, 2017, 7 Pages.

\* cited by examiner

100

110 From: John Smith

112 To: Bob Jones; Dave Lee

114 Re: 2015 summer marketing campaign

116 Date: May 1, 2014 12:01 PM

120 Let's set up a time to review the new marketing campaign.

FIG 1

Profile n

500

510.1

Property 1 (First name)

Value: Bob                          Property score: 90

510.2

Property 2 (Last name)

Value: Jones                        Property score: 90

510.3

Property 3 (Hobbies)

Value 1: tennis                     Property score: 60

Value 2: Europe travel              Property score: 40

510.4

Property 4 (extracted key phrases)

Value 1: marketing campaign         Property score: 95

Value 2: 2015 summer                Property score: 80    ⎫ 512

Value 3: little league soccer team  Property score: 75

FIG 5

CONTEXTUAL PEOPLE RECOMMENDATIONS

CROSS-REFERENCE TO RELATED APPLICATIONS

This application claims the benefit of U.S. Provisional Application No. 62/154,039, filed Apr. 28, 2015, and U.S. Provisional Application No. 62/156,362, filed May 4, 2015, the disclosures of which are hereby incorporated by reference.

BACKGROUND

Widespread communications applications such as email, document sharing, and social networking are connecting more and more people. As people's contacts lists grow ever larger, it becomes more difficult to determine the most relevant people to receive a message or join in a conversation. For example, when a user considers calling a meeting of people to engage in a new project, the user may have to rely on his or her own memory to generate the appropriate personnel list. The user may thus leave out certain people who may be important, or inadvertently include people who may not be relevant. Other similar scenarios include identifying relevant recipients of an email, contacts on a social network, parties with whom to share documents, etc.

Existing automatic people recommendation techniques may recommend recipients using certain basic signals, such as first letters of a user-input name, or most frequently emailed contacts, etc. It would be desirable to leverage additional, deep contextual features of a communications item such as a message or conversation to improve the quality and relevance of people recommendations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for generating people recommendations based on contextual signals of a user-created communications item. In certain aspects, a personal profile containing scored key phrases is built for each of a plurality of personal entities. A score for each key phrase may be generated, e.g., based on relevance of the key phrase to a communications item or conversation in which the personal entity is a participant.

Subsequently, when a user creates a new communications item, contextual signals of the item are extracted and provided to a recommendation block, which includes first-layer (L1) and second-layer (L2) ranking blocks. In L1 ranking, multi-dimensional vector correlation may be performed between the extracted contextual signals and the personal profiles to identify a set of top-ranked L1 candidate profiles. In L2 processing, the L1 candidate profiles are further scored and ranked using deep contextual signals, e.g., applying deep semantic similarity models (DSSM) and other algorithms. The highest ranked profiles from L2 processing are provided to the user as people recommendations for the new communications item. In an aspect, people recommendations may be reactively generated in response to explicit user query, or they may be proactively generated as the user is creating the communications item.

Other advantages may become apparent from the following detailed description and drawings.

BRIEF DESCRIPTION OF THE DRAWINGS

FIG. 1 illustrates an exemplary user interface for an email client software illustrating certain aspects of the present disclosure.

FIG. 5 illustrates an example of a personal profile corresponding to a single personal entity.

DETAILED DESCRIPTION

Figure 2:
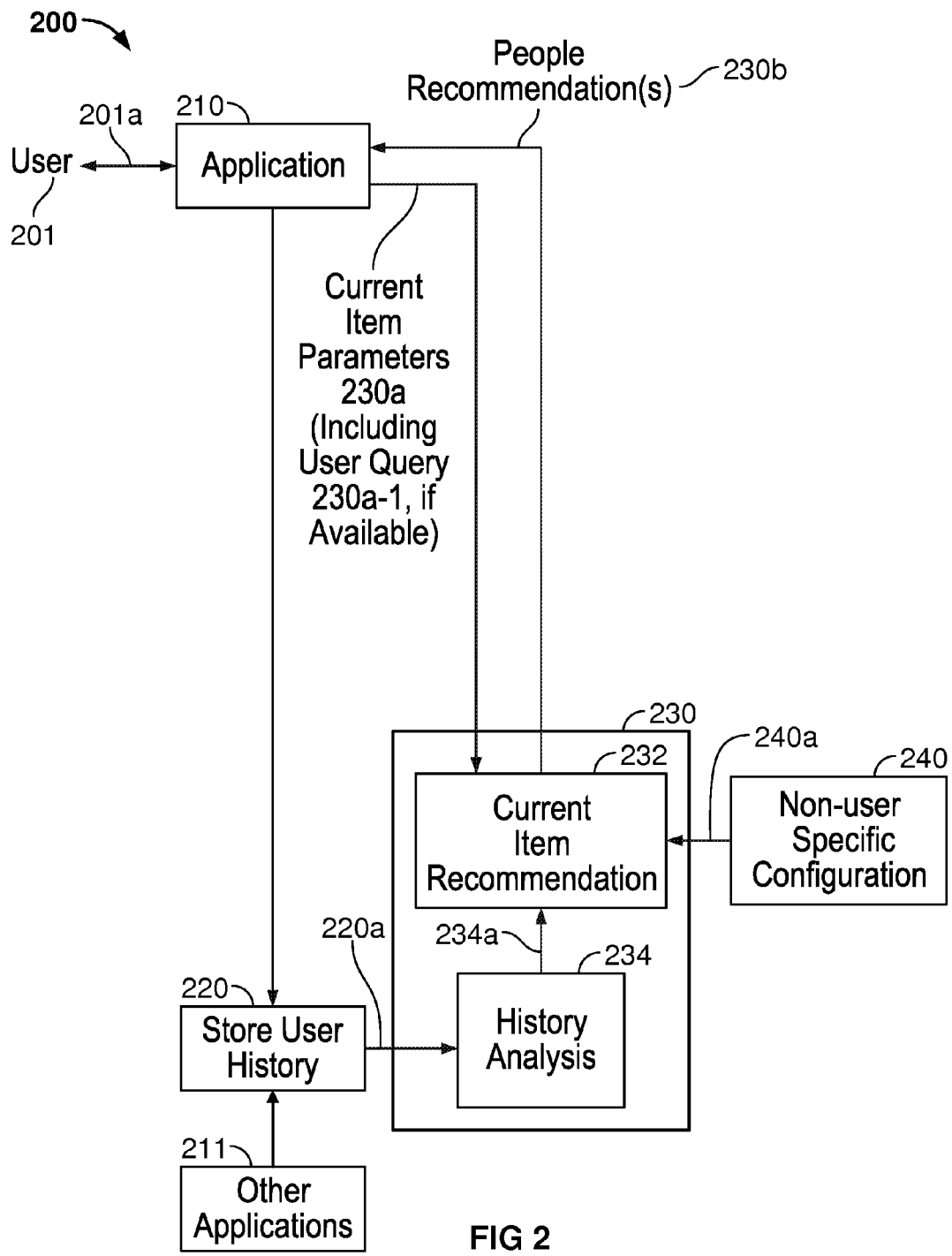
FIG. 2 illustrates an exemplary embodiment of an email recipient recommendation system according to the present disclosure.

Various aspects of the technology described herein are generally directed towards techniques for generating people recommendations using contextual features of user-created items. The techniques may be applicable to recommending recipients for email, meeting invites, text messages, social networking, or shared documents, etc. Further applications include, but are not limited to, instant messaging, applications for Internet calling, customer relationship management (CRM) for identifying business relationships, online gaming applications wherein it is desired to identify other parties to play/share content with, etc. It will be appreciated that any application wherein a user chooses to connect or communicate with other users may utilize the techniques of the present disclosure.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. Note the term "conversation" as used herein may generally denote any user-created communications item that is or subsequently will be shared with or sent to other people, unless otherwise noted. Further note the term "people" as used herein is not meant to only denote one or more individual persons, but may also be understood to refer to any entity that can be recommended by the system for inclusion in a conversation. Thus groups, organizations, mailing lists, social networking groups, etc., will also be understood to fall within the scope of "people" that may be recommended by the system.

In designing software for connecting people with each other such as described hereinabove, it would be desirable to provide such software with the capability to intelligently predict and recommend suitable recipients for a user-created communications item based on context of the item. For example, when a user composes email relating to a certain task or project, the email software may intelligently predict people who are most relevant to such task or project, and recommend those people to the user as email recipients. Alternatively, when a user considers assembling a team of people to engage in a new project, the task management software may recommend a list of people most likely relevant to the new project.

Techniques of the present disclosure advantageously provide a people recommendation system for predicting and recommending relevant people or other personal entities to include in a communications item based on a variety of contextual indicators. The recommendations may be provided to the user reactively, e.g., in response to a specific query by the user to the people recommendation system, or proactively, e.g., based on the context of what the user is currently working on, in the absence of a specific query by the user.

FIG. 1 shows an exemplary user interface for an email client software illustrating certain aspects of the present disclosure. Note FIG. 1 is shown for illustrative purposes only, and is not meant to limit the scope of the present disclosure to email applications, or to any particular types of user interfaces, email clients. Other exemplary embodiments may apply the present techniques to, e.g., people recommendation for meeting invitations, text messages, instant messaging applications, social networking platforms containing posts or tweets, other sharing applications, etc. In an alternative exemplary embodiment, a user may create a message or captioned image on a social network and share it with other users, based on, e.g., contextual signals such as most active users, previous actions on the social network, keywords, shared interests, tags, hashtags, internet browsing history, etc. Such alternative exemplary embodiments are contemplated to be within the scope of the present disclosure.

In FIG. 1, an email message 100 includes sender field 110, recipient field 112, subject field 114, date and time field 116, and body 120. When a user composes email 100, the email client software (also denoted herein as an example of a "content creation application") may use certain contextual signals, as further described hereinbelow, to recommend one or more recipients or "people recommendations" to the user, e.g., for inclusion in the recipient field 112.

FIG. 2 illustrates an exemplary embodiment of a people recommendation system 200 according to the present disclosure. In an exemplary embodiment, system 200 may generate the people recommendations for email 100.

In FIG. 2, user 201 provides text or other input 201a (e.g., "user input") through content creation application 210. In an exemplary embodiment, application 210 may correspond to, e.g., an online or offline (locally stored) email client software application for receiving, composing, editing, sending emails, etc. In alternative exemplary embodiments, application 210 may correspond to any application for receiving user input 201a to create a conversation, e.g., word processing software for creating local or shared documents, social networking website user interface, online meeting setup interface, text message or other instant messaging application, etc., as illustratively described hereinabove.

At block 220, user input 201a to application 210, as well as any communications items previously received through application 210 (e.g., from other people), is cumulatively stored in user history 220a. In an exemplary embodiment, history 220a may include one or more data files that include all items cumulatively created or processed by application 210 or other applications 211, e.g., messages (such as emails) sent and received between the user and other persons, documents (e.g., with or without senders and/or recipients), chat conversations (e.g., chat histories), calendar items, meeting requests, agendas, posts or updates on social messaging applications, and/or metadata (e.g., including time/date indicators, location indicators if available, etc.) associated with such items, etc.

Note history 220a may generally include communications items from a plurality of communications applications not limited to application 210. History 220a may be stored on a local hard drive or on a remote server.

In FIG. 2, application 210 further supplies current item parameters 230a from user input 201a to recommendation engine 230. Current item parameters 230a may include, e.g., the content of a communications item (e.g., email item, meeting invitation, social network update, etc.) currently being composed by user 201. Parameters 230a may also (but need not) include an explicit user query 230a-1, corresponding to a query explicitly submitted by user 201 for people recommendations from recommendation engine 230. In an exemplary embodiment, parameters 230a may further include other contextual signals and metadata of the item being composed, including time of day, current user location, etc.

Recommendation engine 230 analyzes parameters 230a and user history 220a to generate people recommendation(s) 230b for the current item. In particular, people recommendation(s) 230b may correspond to one or more additional people or other entities who the user may wish to include as recipient(s) of the current item. Note in an exemplary embodiment, user 201 may specifically request (e.g., submit an "explicit query") that engine 230 provide people recommendation(s) 230b, e.g., by clicking on a "people recommendation" button or menu item in a user interface of application 210. The contents of such an explicit query may be designated herein as user query 230a-1. Alternatively, engine 230 may automatically provide recommendation(s) 230b via application 210 as it receives parameters 230a, e.g., without user 201 explicitly requesting such recommendations. Such alternative exemplary embodiments are contemplated to be within the scope of the present disclosure.

In the exemplary embodiment shown, recommendation engine 230 includes a history analysis engine 234, which identifies relationships between certain contextual signals in user history 220a and potential people recommendation candidates, as further described hereinbelow with reference to FIG. 3. The identified relationships are quantified and organized in the form of personal profiles associated with possible the people recommendation candidates (also denoted herein as "personal entities") to be recommended, and the personal profiles are aggregated to generate aggregate personal profiles 234a. Recommendation engine 230 further includes current item recommendation block 232, which generates people recommendation(s) 230b for the current item based on parameters 230a and aggregate personal profiles 234a.

In an exemplary embodiment, recommendation block 232 may further receive non-user specific configuration 240a from non-user specific configuration block 240 to aid in generating people recommendations. Such non-user specific configuration 240a may include, e.g., relationships between certain key phrases that may not be ascertainable from user history 220a, which nevertheless may be relevant to generating people recommendation(s) 230b. For example, user history 220a may explicitly associate a key phrase such as "marketing campaign" with a profile, but not a phrase such as "advertising campaign," even though the two phrases may be related. However, based on non-user specific configuration 240a, e.g., from openly available Internet usage records, etc., block 232 may nevertheless be able to recommend personal profiles associated with key phrase "marketing campaign" when parameters 230a contain the phrase "advertising campaign." In an exemplary embodiment, non-user specific configuration 240a may be utilized, e.g., in a Layer 2 (L2) ranking block 730 as further described hereinbelow with reference to FIG. 7.

Figure 3:
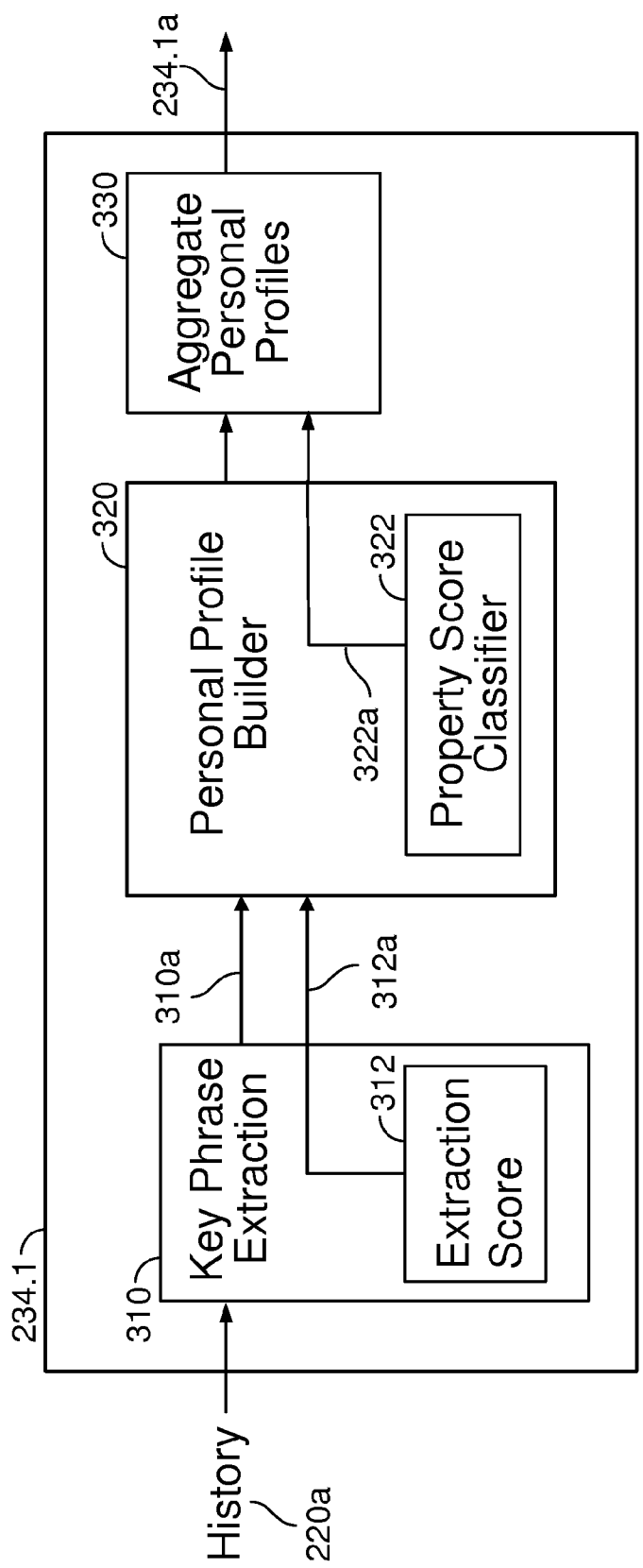
FIG. 3 illustrates an exemplary embodiment of history analysis engine of FIG. 2.

FIG. 3 illustrates an exemplary embodiment 234.1 of history analysis engine 234 of FIG. 2. Note engine 234.1 is shown for illustrative purposes only, and is not meant to limit the scope of the present disclosure. Engine 234.1 includes a key phrase extraction block 310, personal profile builder 320, and aggregate personal profile block 330 generating aggregate personal profiles 234.1a.

Figure 4:
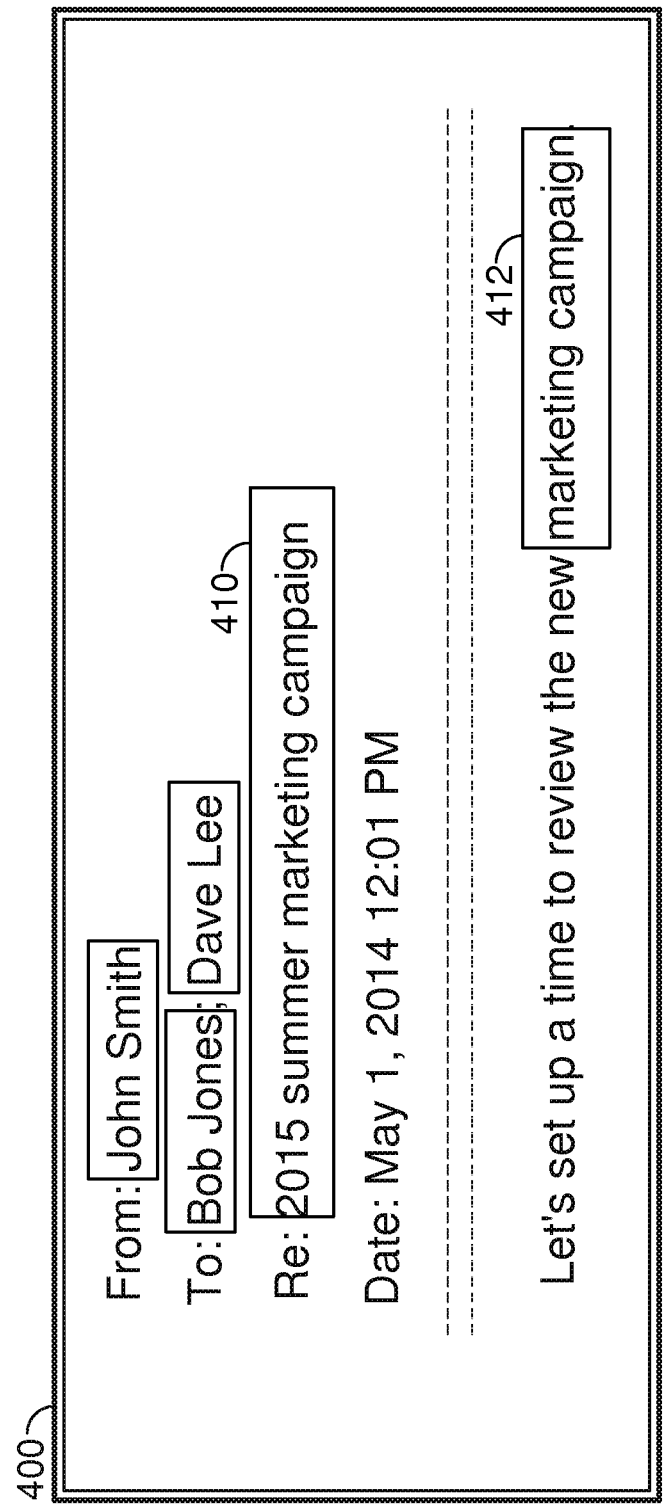
FIG. 4 illustrates an example of key phrase extraction.

In particular, block 310 receives user history 220a as input, and generates extracted key phrases 310a. FIG. 4 shows an example of key phrase extraction, wherein key phrases such as key phrase 410 ("2015 summer marketing campaign") and key phrase 412 ("marketing campaign") are extracted from email 400. Extracted key phrases 310a may represent phrases or other linguistic entities commonly appearing or linked to communications items in history 220a, and may correspond to, e.g., noun phrases, N-grams, semantic symbols, etc.

In an exemplary embodiment, key phrase extraction may be performed using a natural language processing (NLP) technique, e.g., a sentence breaker followed by a shallow parser. Other techniques to extract key phrases include, e.g., applying a white list and/or black list. In particular, a "white list" listing a set of phrases may be defined, and any appearance of a phrase in the white list in a communications items may automatically be extracted as a key phrase. Similarly, a "black list" may define a set of phrases which are generally not to be extracted from communications items, and may include, e.g., sensitive or confidential phrases, or phrases that are not well-suited to key phrase extraction (e.g., common words like "and," "because," etc.).

Further techniques to extract key phrases may include, e.g., applying a deep semantic similarity model (DSSM) or other machine learning techniques to individual items or conversations in history 220a, e.g., using semantic features as derived from a DSSM. In particular, a neural network applying DSSM may accept a sentence from an item in history 220a as input, and generate as output certain key phrase candidates. Note the DSSM itself may be trained using items from across a variety of users, sources, etc., and need not be restricted to one user. The DSSM may derive embeddings mapping words or phrases in history 220a to lower-dimensional vectors.

Furthermore, key phrases may be extracted by utilizing feature sets such as non-semantic features (NSF), e.g., capitalization, frequencies of occurrences, positions of occurrences, stop words matching, punctuation, recipient name and alias matching, etc.

In an exemplary embodiment, key phrase extraction block 310 may generate an extraction score 312a corresponding to each key phrase extracted, using block 312. The extraction score 312a may provide an indication of, e.g., how important the extracted key phrase is to a certain item. For example, extraction score 312a may correspond to a number from 0-100, wherein a higher value may be assigned based on, e.g., higher frequency of occurrences of a key phrase in an item, placement of a key phrase near the beginning of the item, etc. The extraction score 312a may be used, e.g., by subsequent processing blocks as a soft metric to weight the importance of the key phrase in computations wherein the key phrase is used as a variable.

Following key phrase extraction 310, block 320 builds a personal profile for each of a plurality of personal entities. Each personal entity may correspond to an individual person, group of persons, company, team, entity, etc., identified in user history 220a. Note the term "person" may also be used herein to refer to personal entity, although it is not meant to suggest that such a "person" need necessarily correspond to only one individual person. Rather, such a "person" may be understood to refer to a group of persons, or a team, an organization, etc., as will be understood from the context.

FIG. 5 shows an example of a personal profile 500 ("Profile n") corresponding to a single personal entity. Each personal profile contains a plurality of properties associated with that personal entity. Each property may contain a corresponding value, along with a corresponding "property score" quantifying, e.g., how relevant the property value is to that profile. In particular, the property score associated with each property value may generally quantify the likelihood that a given personal entity is associated with a communications item (such as an email), given that the communications item includes that property value.

Note the properties for personal profile 500 explicitly shown in FIG. 5 and described herein are for illustrative purposes only, and are not meant to limit the scope of the present disclosure to personal profiles containing or not containing any of the particular properties shown, or any particular property values, scores, or scoring ranges shown.

For example, property 510.1 of profile 500 includes a first name of an individual associated with the personal entity, e.g., having value "Bob", and a corresponding property score indicating how relevant the property value "Bob" is to Profile n, e.g., a property score of 90. In the exemplary embodiment shown, the range of property scores may correspond to 0-100, with 0 corresponding to not relevant and 100 corresponding to maximally relevant, although alternative scaling ranges may readily be adopted. Further examples of properties include property 510.2, defining the last name, and property 510.3, listing hobbies of the individual, etc., as determined from explicit user input or other means.

In an exemplary embodiment, profile 500 may further include a property 510.4, corresponding to a list 512 of key phrases (and/or semantic symbols, e.g., as identified by DSSM) associated with that personal entity, each associated key phrase having a corresponding property score. In an exemplary embodiment, a key phrase may be associated with a personal entity if, e.g., the key phrase occurs in a communications item sent to, received from, or otherwise related to the personal entity. In an alternative exemplary embodiment, a key phrase may be associated with a personal entity even if the key phrase does not explicitly occur in communications items sent to or received from the personal entity.

In an exemplary embodiment, a property score classifier 322 (also referred to as a "property scoring model") may assign property score 322a to each key phrase extracted from user history 220a. The classifier may utilize certain inputs to generate property score 322a corresponding to an extracted key phrase, e.g., the importance of an item (e.g., as explicitly designated by the user or other recipient/sender of the item) in user history 220a containing the key phrase, the importance of the key phrase to the item (e.g., based on extraction score 312a), time decay applied to the item containing the key phrase (e.g., more recent items are deemed more significant and thus weighted more heavily) utilizing first or last occurrence time stamp, number of occurrences in the last month, etc.

Other inputs used to generate a property score may include the number of email interactions (e.g., emails sent, received, or carbon copied) between a user and a person included in an item in which a key phrase appears, number of document sharing interactions containing a key phrase, number of times a key phrase appears in an instant message conversation history, etc., key phrase importance features (e.g., extraction scores, statistics of email importance scores), etc. Note the property scoring model may generate the score according to a cumulative or combined function of the values of these features, e.g., as implemented by a neural network derived from machine learning techniques.

In an exemplary embodiment, property score classifier 322 may be trained using a combination of user-specific history 220a and a non-user specific corpus. For example, a group of human evaluators may be supplied with a representative (non-user specific) corpus of communications items, e.g., emails, meeting invitations, etc., and asked to label the relevance of each extracted key phrase to the item it appears in, e.g., by assigning a property value, or a rating corresponding to bad, fair, good, excellent, perfect ratings. For example, in the example email of FIG. 1, the phrase "marketing campaign" may be labeled as "perfect" by an evaluator, corresponding to highest relevancy of the phrase to the communications item, while the phrase "time" may be labeled as "bad."

The evaluator-supplied labels, along with other inputs mentioned hereinabove such as email importance, etc., may be used to train a machine learning model to implement property score classifier 322 to optimally assign property scores to key phrases. In an exemplary embodiment, the training may be performed in an "offline" mode, e.g., separately from real-time functioning of the recommendation block 232, and (not necessarily) using items found in user history 220a. In an exemplary embodiment, a general corpus of representative communication items from a diverse set of users may be employed. In an exemplary embodiment, the machine learning model may employ boosted decision tree techniques, logistic regression, neural networks, etc.

Once the underlying machine learning models are trained, property score classifier 322 may then be utilized in an online mode, whereby a property score is assigned by classifier 322 to each extracted key phrase in each communications item using the trained algorithms.

In a further exemplary embodiment, the algorithms underlying property score classifier 322 may be further trained during real-time operation of the people recommendation system 200. For example, key phrases extracted from a communications item (e.g., by block 310 on items in user history 220a, or by block 712 on current item parameters 220a) may be delivered (instantaneously or periodically) to the user as "hashtag" candidates, and the user may be prompted to accept or reject (or provide even finer ratings such as perfect, excellent, good, etc.) the hashtag as a key phrase relevant to a particular communications item. The user acceptance or rejection can then be used to label the relevance of the hashtag candidate, and the resulting data may then be used to re-train algorithms underlying property score classifier 322. Such exemplary embodiments are contemplated to be within the scope of the present disclosure.

For example, for the illustrative email 100 shown in FIG. 1, a user "John" may commonly exchange emails or other documents with a recipient "Bob," and such communications items may contain extracted key phrases "2015 summer" and "marketing campaign." Accordingly, "2015 summer" and "marketing campaign" may be key phrases associated with Bob's personal profile, e.g., Property 510.4 in FIG. 5. Furthermore, property score classifier 322 may assign property scores of 95 and 80 to "2015 summer" and "marketing campaign," respectively. The user may then be presented a hashtag of "marketing campaign," and requested to accept or reject the association of this hashtag with the recipient Bob, or with the email 100.

In an exemplary embodiment, each personal profile may further be assigned a property (not shown) corresponding to a profile importance score, indicating how important that personal entity is to the user. The profile importance score may be explicitly entered by the user, or it may be inferred by system 200 based on, e.g., frequency of user interaction with that personal entity based on user history 220a. The profile importance score may be used in further calculations performed by recommendation engine 230, e.g., L1 candidate identification block 720 described hereinbelow.

At block 330, personal profiles for each entity output by block 320 are collected across all personal entities to generate aggregate personal profiles 234.1a.

Figure 6:
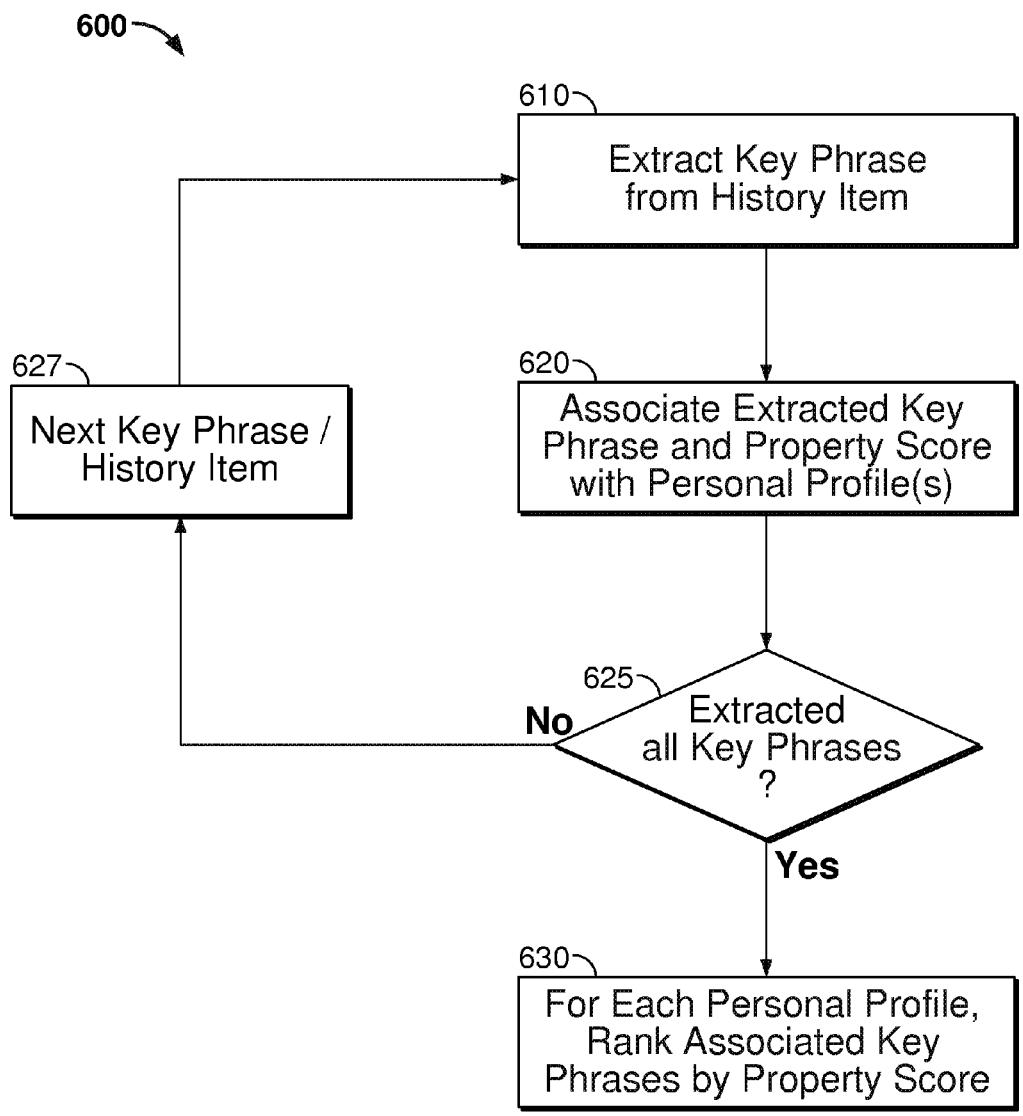
FIG. 6 illustrates an exemplary embodiment of a method for assigning key phrases to personal profiles according to the present disclosure.

FIG. 6 illustrates an exemplary embodiment of a method 600 for assigning key phrases to personal profiles according to the present disclosure. At block 610, one or more key phrases are extracted from each item in history 220a in FIG. 2. At block 620, one or more key phrases are associated with one or more corresponding personal profiles. For example, each key phrase may be associated with the profile of any and all recipients of the corresponding item in history 220a. At block 625, it is determined if all key phrases have been extracted, e.g., for each item, and across all items in history 220a. If no, the method proceeds via block 627, and returns to block 610 to continue extraction. If yes, the method continues to block 630. At block 630, associated key phrases are scored with a property score and ranked within each personal profile.

Figure 7:
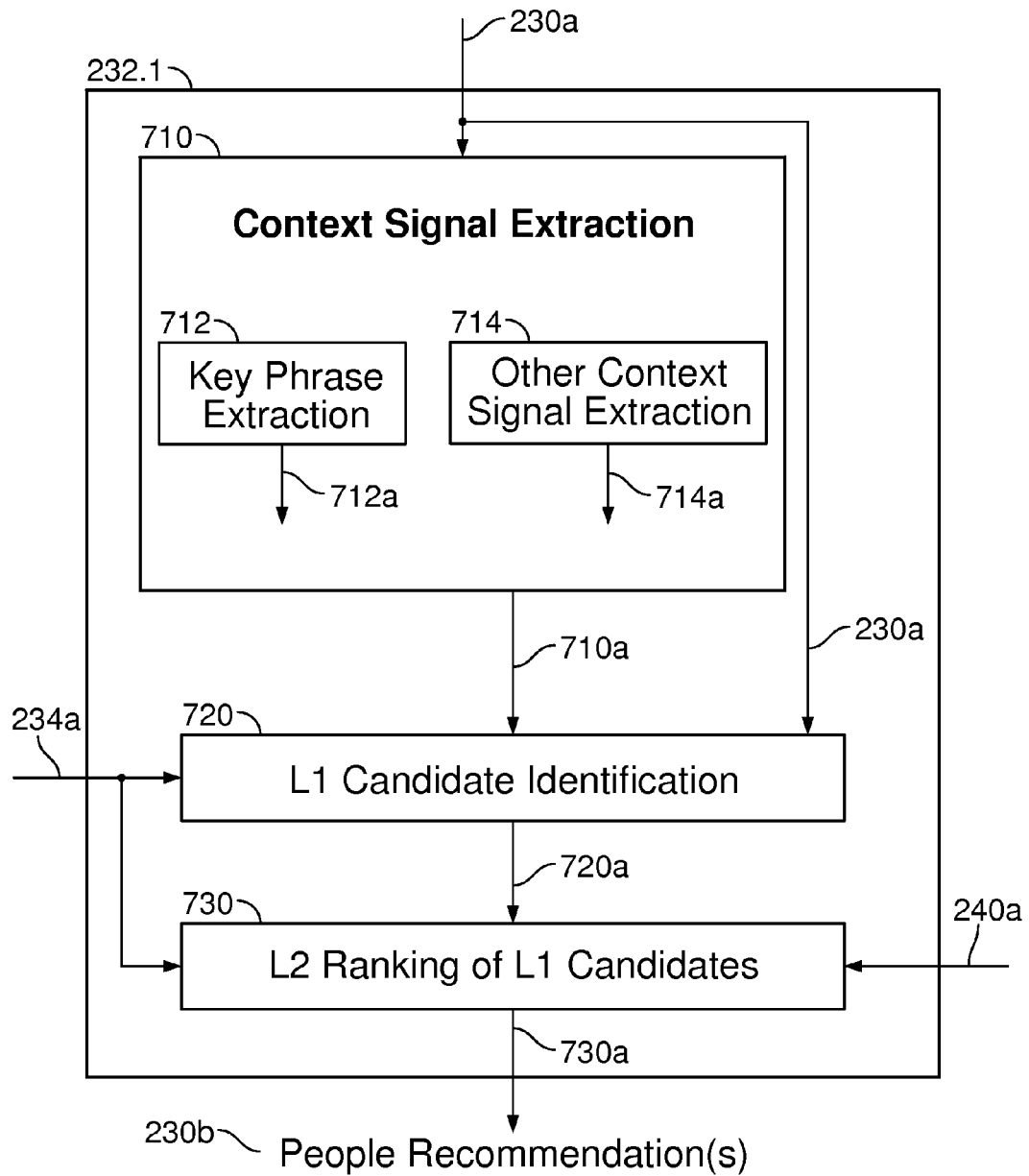
FIG. 7 illustrates an exemplary embodiment of recommendation block of FIG. 2.

FIG. 7 illustrates an exemplary embodiment 232.1 of recommendation block 232 of FIG. 2. At block 710, context signals 710a are extracted from parameters 230a. In an exemplary embodiment, block 710 may contain a key phrase extraction block 712 to extract key phrases in a manner similar or identical to block 310 of FIG. 3, and thus context signals 710a may include a list of key phrases extracted by block 712. Block 710 may further extract other context signals 714 such as project names appearing in a message or document, text of the message subject and body, related people (e.g., people already listed in a recipient field or other portion of the item), the application in which a message or document is generated (e.g., corresponding to the type of application 210, such as email client, word processing software, etc.) and its use scenario, current date and time, current user location, etc.

Once signals 710a are extracted at block 710, they are provided along with parameters 230a to L1 candidate identification block 720 to select a candidate subset 720a (also denoted herein as "first-layer candidates" or "L1 candidates") of profiles from aggregate personal profiles 234a that are most likely related to signals 710a and parameters 230a. In an exemplary embodiment, the candidate subset 720a corresponds to candidate profiles that are judged on a first-pass search (e.g., "Layer 1" processing) to be most relevant to parameters 230a and signals 710a.

Figure 8:
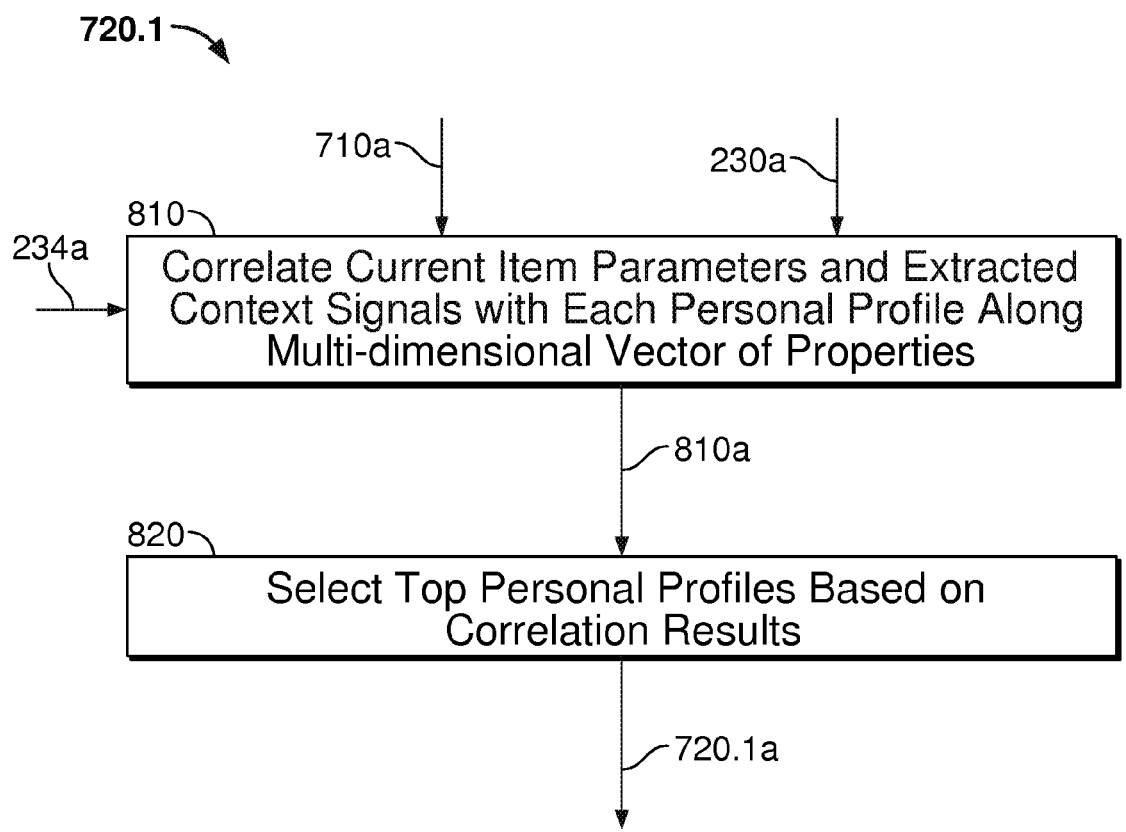
FIG. 8 illustrates an exemplary embodiment of L1 candidate identification block of FIG. 7.

FIG. 8 illustrates an exemplary embodiment 720.1 of L1 candidate identification block 720 of FIG. 7. At block 810, parameters 230a and context signals 710a are correlated with each personal profile in aggregate personal profiles 234a to generate a correlation score for each personal profile 810a. In an exemplary embodiment, the correlation may be performed along multiple dimensions, e.g., as defined by a multi-dimensional vector of properties contained in each personal profile.

In particular, L1 candidate identification may compute the correlation between: 1) a first vector containing one or more components of context signal 710a and parameters 230a, such as extracted key phrases or user query 230a-1, etc., and 2) a second vector containing multiple properties associated with each personal profile.

For example, if user query 230a-1 is available (e.g., the user has issued a specific query to system 200 for people recommendation), then the first vector (FV) may include a single component corresponding to user query 230a-1:

First vector(FV)=[user query 230a-1]  (Equation 1).

In conjunction with user query 230a-1, or if no user query 230a-1 is available, FV may be populated with other signals, e.g., one or more extracted key phrases from parameters 230a. Note the first vector may also be written as, e.g., FV=[n1; n2; . . . ; nF], where "F" in the variable "nF" represents the total number of dimensions of the first vector, and F=1 (i.e., only one dimension) in Equation 1 above.

A second vector for a given personal profile m may correspond to, e.g.:

Second vector(SV) for personal profile m=[profile m first property value; profile m second property value; . . . ; profile m S-th property value]  (Equation 2);

wherein each dimension of SV corresponds to a property value of the given personal profile, and S represents the total number of dimensions of the second vector SV. For example, SV may contain all or any subset of the property values associated with profile 500 in FIG. 5.

A second score vector (SSV) corresponding to SV may further be defined as follows, containing the property score of each property listed in SV:

Second score vector(SSV) for personal profile m=[profile m first property score; profile m second property score; . . . ; profile m S-th property score]  (Equation 3);

wherein the property score is as earlier described hereinabove with reference to Profile n in FIG. 5.

Define a "match" between a component FV[f] of FV and a component SV[s] of SV as follows:

Match (FV[f], SV[s])=P for perfect match between FV[f] and SV[s];
C for complete match between FV[f] and SV[s];
N for no match between FV[f] and SV[s];

wherein f is an index from 1 to F, s is an index from 1 to S, and wherein P, C, N are assigned numerical values (e.g., e.g., P=100, C=50, N=0), and wherein "perfect match" may denote an entire string match between two text strings, "complete match" may denote a complete substring match between two text strings, etc. Note the match definition is given hereinabove for illustrative purposes only, and is not meant to limit the scope of the present disclosure to any particular types of match definition described. In alternative exemplary embodiments, additional gradations of "match" may be specified than the three (P, C, N) gradations shown hereinabove. Such alternative exemplary embodiments are contemplated to be within the scope of the present disclosure.

Based on the match definition, a first correlation score Correlation1 between the first vector FV and second vector SV may be calculated as follows:

Correlation1(FV,SV)=$\Sigma_{f,s}$ Match(FV[f],SV[s])  (Equation 4);

wherein it will be understood that the indices of summation f, s can be iterated over all dimensions (F, S) of both vectors FV and SV.

In an alternative exemplary embodiment, a second correlation score Correlation2 may be calculated as follows:

Correlation2(FV,SV)=$\Sigma_{f,s}$SSV[s]·Match(FV[f],SV[s])  (Equation 5).

In particular, Correlation2 weights each second vector component match by the corresponding property score.

Note the correlation scores given hereinabove are for illustrative purposes only, and are not meant to limit the scope of the present disclosure to any particular techniques for deriving correlation scores between two vectors. In alternative exemplary embodiments, correlation components may further be weighted by a profile importance score as described hereinabove, number of occurrences of a first vector component in parameters 230a, etc. Furthermore, in alternative exemplary embodiments, the summation expressed in Equations 4 and 5 may be replaced by other operations, e.g., computation of L2-norm, or any other distance metric. Alternatively, correlation may be calculated using non-linear techniques. Such alternative exemplary embodiments are contemplated to be within the scope of the present disclosure.

At block 820, the preferred candidate subset 720.1a is selected based on the top values associated with the correlation results for each profile. In particular, based on the correlation scores (e.g., either Correlation1, Correlation2, or some other correlation score derivable using the techniques described herein), a set of the top relevant profiles from aggregate personal profiles 234a (e.g., those profiles having the highest correlation scores) may thus be identified by L1 candidate identification 720.

In an exemplary embodiment, ranking of the correlation scores may be performed using a trie or inverted tree ordered data structure. Trie and inverted indices may be used to boost the speed of the algorithm, to calculate a perfect/complete/no match features given a large number of candidates.

As an illustrative example of L1 ranking, suppose user 201 has already typed the letters "PH" in a recipient field of an email message, and parameters 230a corresponding to the email message are forwarded to system 200. Parameters 230a may thus include a user query component 230a-1 containing the letters "PH." Block 232 may, in response, calculate a correlation score for each profile indicative of how relevant the letters "PH" are to that profile. Relevant profiles identified by block 720 may include, e.g., a personal profile associated with a name "Phil Smith," another personal profile associated with a job function of "physician," etc.

In an exemplary embodiment, user 201 may explicitly specify "hard" rules for how L1 candidate identification 720 identifies the set of relevant L1 candidates. In particular, in conjunction with (or in lieu of) computing and ranking profiles having the greatest correlation scores as described hereinabove, L1 candidate identification 720 may be configured to always include certain types of profiles as L1 candidates 720a. For example, one such user-specified hard rule may specify that any time a user query 230a-1 contains a perfect match (P) with a "first name" or "last name" property value of any profile, then that profile should be included in the L1 candidates 720a, regardless of the results of correlation score ranking. It will be appreciated that such hard rules may be personalized and stored, e.g., in a configuration file, for each of a plurality of different users of people recommendation system 200.

Returning to FIG. 7, following identification of candidate profiles by L1 candidate identification block 720, candidate profiles 720a may be provided to L2 ranking block 730 to generate a ranked set 730a, corresponding to the results of a second-pass ranking (e.g., "Layer 2" processing). The ranked set 730a of personal profiles may then be provided as people recommendations 230b. It will be appreciated that, as further described hereinbelow, L2 ranking block 730 may take into account more sophisticated factors and determinants than L1 candidate identification 720, and may accordingly consume more time and computation resources in generating a relevancy score for each profile.

In view of the architecture described with reference to block 232.1, it will be appreciated that splitting the people recommendation/ranking task into a first (coarse) L1 ranking to quickly identify a subset of relevant profiles, and then performing a second (extensive) L2 ranking on the subset of profiles to refine the people ranking, may advantageously provide an optimal balance between performance and computational resource requirements for the system. It will thus be appreciated that an objective of L1 processing is to be reasonably complete but quick in identifying relevant profiles, while an objective of L2 processing is to be precise in ranking the L1 candidate profiles.

Figure 9:
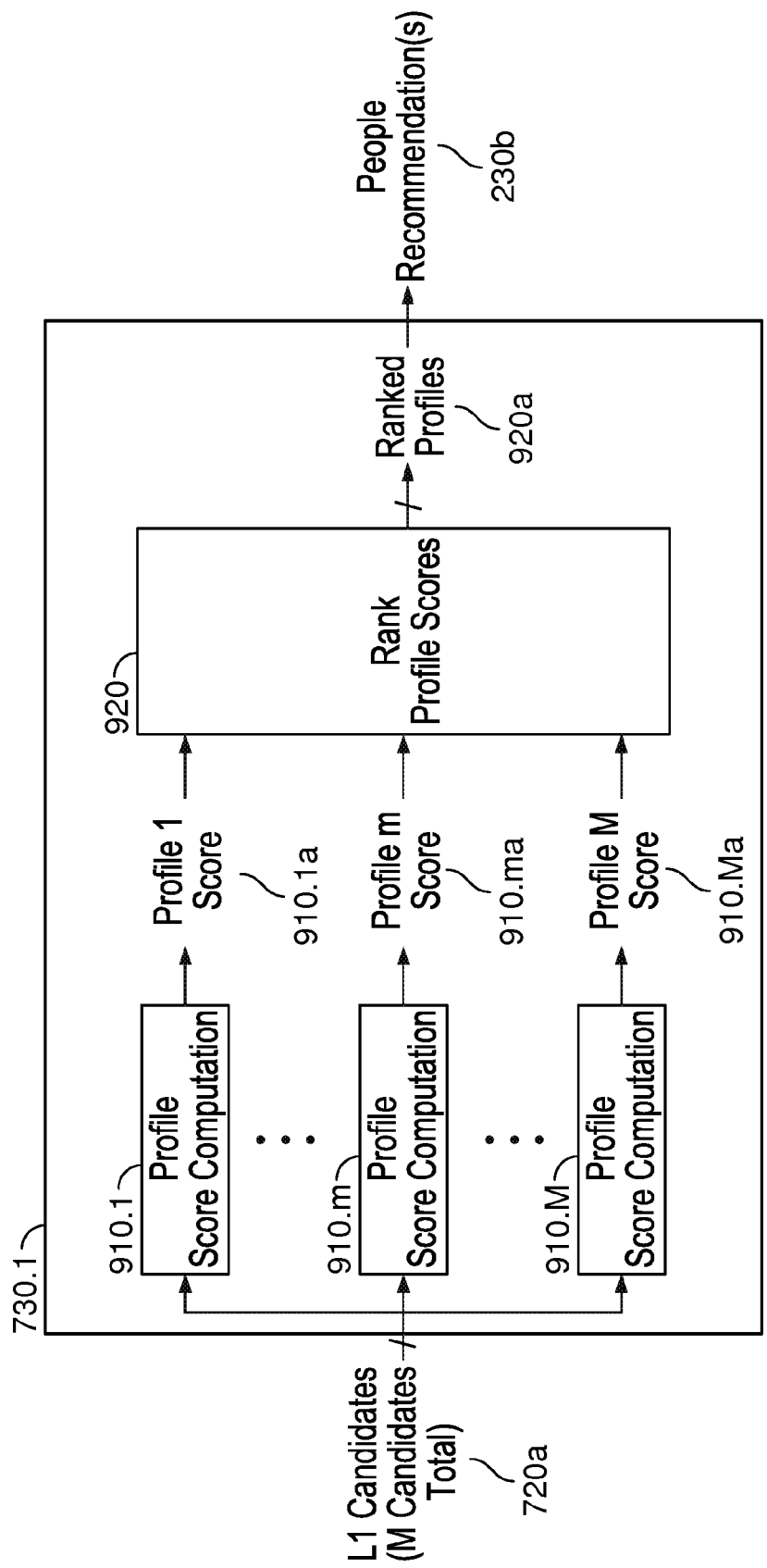
FIG. 9 illustrates an example of L2 ranking block of FIG. 7.

FIG. 9 illustrates an example 730.1 of L2 ranking block 730 of FIG. 7. In particular, score computation 910.1, . . . 910.m, . . . 910.M is performed for each profile of candidate subset 720a identified by L1 candidate identification block 720, wherein M is a number representing the number of profiles identified by block 720. Following score computations, the scores 910.1a, . . . 910.ma, . . . 910Ma for each profile (e.g., Profile 1 through Profile M) are provided to a ranking block 920 which ranks the scores by value. The output of block 920 includes a list of ranked profiles 920a, from which one or more people recommendation(s) 230b may be generated, e.g., based on the top score(s).

Figure 10:
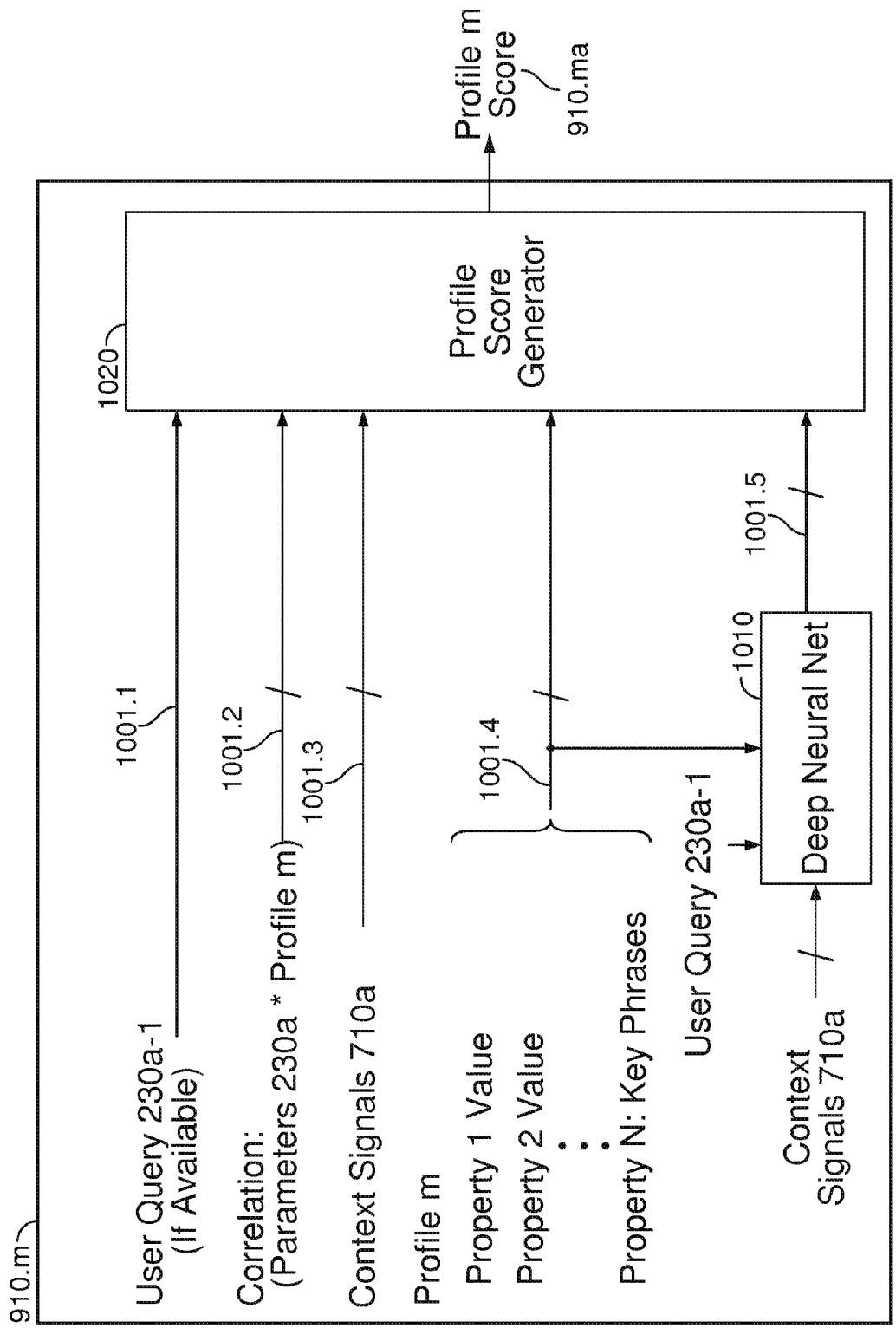
FIG. 10 illustrates an exemplary embodiment of a score computation block in FIG. 9 for an m-th profile.

FIG. 10 illustrates an exemplary embodiment of a score computation block 910.m in FIG. 9 for an m-th profile. It will be appreciated that similar techniques may be used to implement score computation for any arbitrary personal profile.

In FIG. 10, block 910.m includes ranking score generator 1020, which receives a plurality of inputs 1001.1, 1001.2, 1001.3, 1001.4, 1001.5, to generate profile score 910.ma for the m-th profile.

In particular, input 1001.1 may correspond to an explicit user request (if available) for people recommendation from the system, e.g., user query 230a-1 as described hereinabove with reference to FIG. 2. Note in certain instances, if no explicit user request is made, e.g., when engine 230 automatically (proactively) provides people recommendation(s) to the user in the absence of an explicit user query, then input 1001.1 may be empty.

Input 1001.2 may correspond to the results of correlation between parameters 230a (e.g., including context signals 710a) and each personal profile in aggregate personal profile 234a, as described hereinabove with reference to FIG. 8. For example, input 1001.2 may include a multi-dimensional vector representing the results of such correlation along a plurality of different dimensions.

Input 1001.3 may correspond to context signals 710a that have been extracted, e.g., at block 710 in FIG. 7. Context signals 710a may include (but are not limited to) the following signals: identity and type of device used to compose a conversation (e.g., work computer may generally correspond to work contexts, while a smartphone may correspond to personal/private contexts), email sent and receive time (e.g., as an indicator of work hours versus off-work hours), responsiveness (e.g., defined as the average, minimum, maximum, or median time from receiving an email to replying to the sender), with or without weighting by a time decay, email count features from, to, or carbon copied (cc'ed) a user with time decay, responsiveness features (host, co-attended, accepted, etc.) as derived from meeting invitations.

Further signals included in context signals 710a may include, e.g., web browser data, recipient cache signals and/or feedback loops as obtained from an email server, calendar, or contact manager, etc. Context signals 710a may also include an identity of a content creation application used to create a conversation or communications item, as well as a specific an application task within the content creation application. In particular, context signals 710a may allow differentiation between when a user uses a content creation application to perform one task, versus using the same content creation application to perform another task (also supported by the content creation application). For example, when using a content creation application corresponding to Skype, which supports multiple tasks including voice calling, video conferencing, and text messaging, a user may be provided with different people recommendations by system 200 depending on whether Skype is used to conduct a voice call or text messaging session.

In an exemplary embodiment, an application task previously completed by the user may also be included in context signals 710a. For example, the fact that a user has just finished conducting a Skype voice call with a specific personal entity may in certain instances affect (e.g., increase) the likelihood of following up with an email message to that personal entity within a short time. Such alternative exemplary embodiments are contemplated to be within the scope of the present disclosure.

Input 1001.4 may correspond to the plurality of properties associated with the m-th profile, e.g., as constructed by personal profile builder 320 in FIG. 3. An example profile 500 was described hereinabove with reference to FIG. 5, showing multiple properties (e.g., first name, last name, hobbies, keywords, etc.) which may be associated with a personal profile.

Input 1001.5 may correspond to the output of a deep neural net 1010, which generally classifies a similarity between properties of profile m (including key phrases) and context signal 710a generated from parameters 230a. A deep neural net 1010 may utilize embeddings learned from deep neural networks (such as DSSM) trained by suitably large amounts of data, or use non-user specific configuration 240 in FIG. 2. Note deep neural net 1010 may alternatively or further accept any of the signals indicated in FIG. 10 (e.g., 1001.1, 1001.2, 1001.3, etc.), and such alternative exemplary embodiments are contemplated to be within the scope of the present disclosure.

Returning to FIG. 9, following generation of people recommendation(s) 230*b* from ranked profiles 920*a*, people recommendation(s) 230*b* may be presented to the user in any of a plurality of ways. For example, using techniques disclosed hereinabove, system 200 may suggest the full name or email address of a recipient based on partial entry of a recipient name or address by the user. Alternatively, system 200 may recommend one or more recipients in addition to a list of recipients already entered by the user. Alternatively, system 200 may prompt the user for confirmation, if it is determined that a recipient entered by the user is unlikely to be included as a recipient, given the contextual signals determined by system 200.

In an exemplary embodiment, feedback may be provided in conjunction with the techniques disclosed herein to train the functional relationships present in system 200. For example, if upon receiving a recommendation 230*b* from system 200 based on current parameters 230*a*, user 201 opts not to proceed with recommendation 230*b*, and instead manually selects another (non-recommended) person (P*), then such data may be gathered by system 200 and used as feedback to improve the algorithms implemented. For example, machine learning models used in the ranking score generator 1020 may be updated, e.g., trained using the user-indicated data. Alternatively, the personal profile corresponding to personal entity P* may be updated to include components of current parameters 230*a* (e.g., typed user content) in an existing (e.g., key phrase) or new property field. Furthermore, if user 201 opts to proceed with recommendation 230*b*, then such information may also be utilized by system 200 for real-time or offline training.

Figure 11:
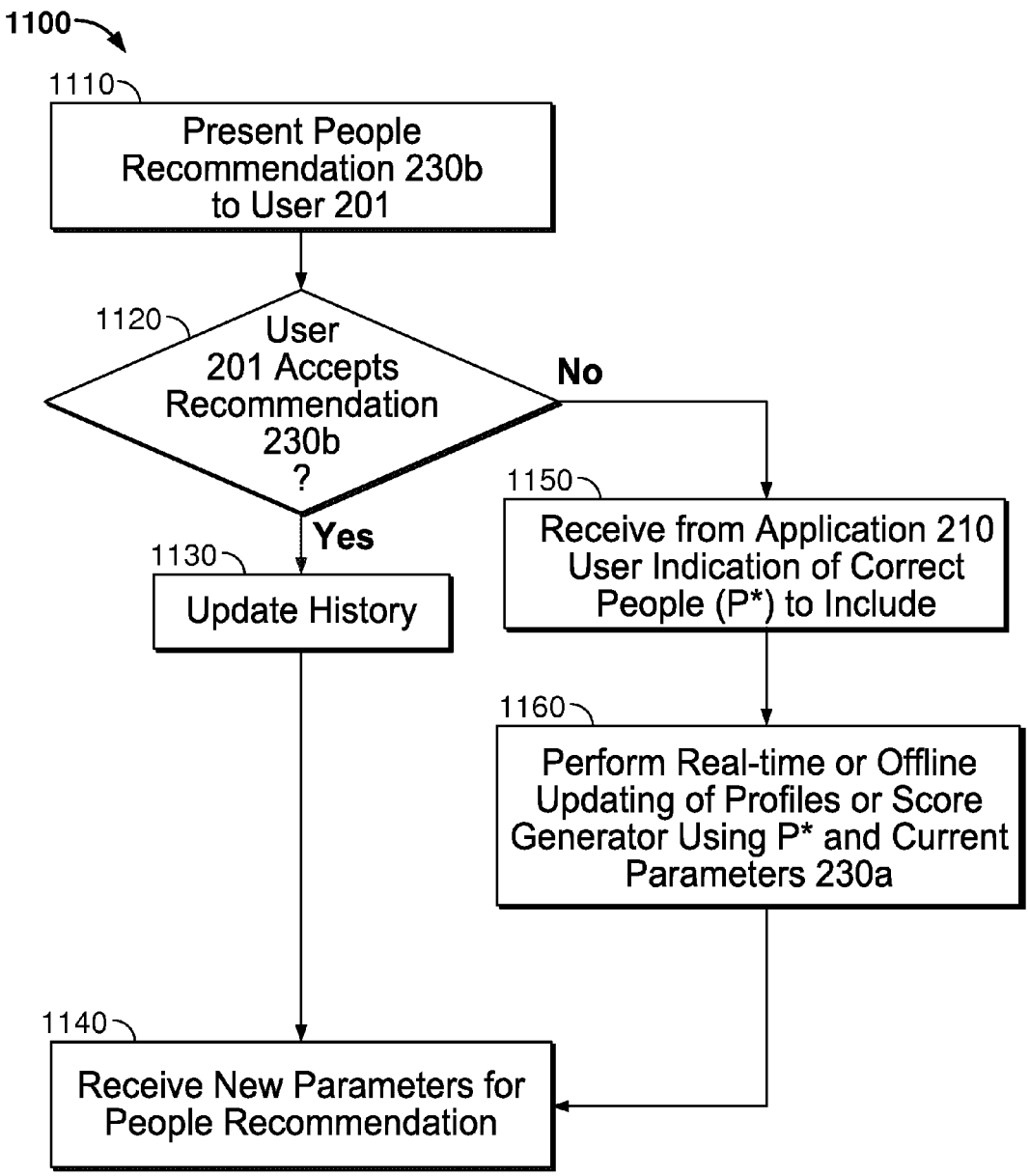
FIG. 11 illustrates an exemplary embodiment of a method for performing system update and feedback according to the present disclosure.

FIG. 11 illustrates an exemplary embodiment 1100 of a method for performing system update and feedback according to the present disclosure.

In FIG. 11, at block 1110, system 200 presents people recommendation 230*b* to user 201.

At block 1120, it is determined whether user 201 accepts recommendation 230*b* or not. If yes, the method 1100 proceeds to block 1130. If no, the method 1100 proceeds to block 1140.

At block 1130, as recommendation 230*b* is accepted by user 201, user history 220*a* is updated, and new parameters 230*a* for a next people recommendation may be received.

Alternatively, at block 1140, as recommendation 230*b* is not accepted by user 201, system 200 will receive information from application 210 regarding the correct people (P*) to include for the current content parameters 230*a*, e.g., as indicated directly by the user. For example, in certain instances, system 200 may recommend a candidate recipient (230*b*) for an email (230*a*) being composed by user 201, and user 201 may reject the candidate recipient. User 201 may instead choose an alternative recipient (P*) as the correct recipient.

At block 1160, based on the indication of the correct recipient (P*) as indicated by user 201, system 200 may perform real-time updating or training of system parameters using the data set defined by P* and current parameters 230*a*.

In an exemplary embodiment, one or more key phrases extracted from current parameters 230*a* (e.g., by block 710 in FIG. 7) may be added to a key phrase property field (e.g., property 510.4 of profile 500 in FIG. 5) of a personal profile corresponding to P*, along with an appropriately generated property score.

In an alternative exemplary embodiment, ranking score generator 1020 in FIG. 10 may be temporarily configured in a real-time "training mode," and algorithm weights/functions in generator 1020 may be updated using the combination of the correct (user-indicated) people P*, along with current parameters 230*a* and corresponding extracted context signals 710*a*.

Figure 12:
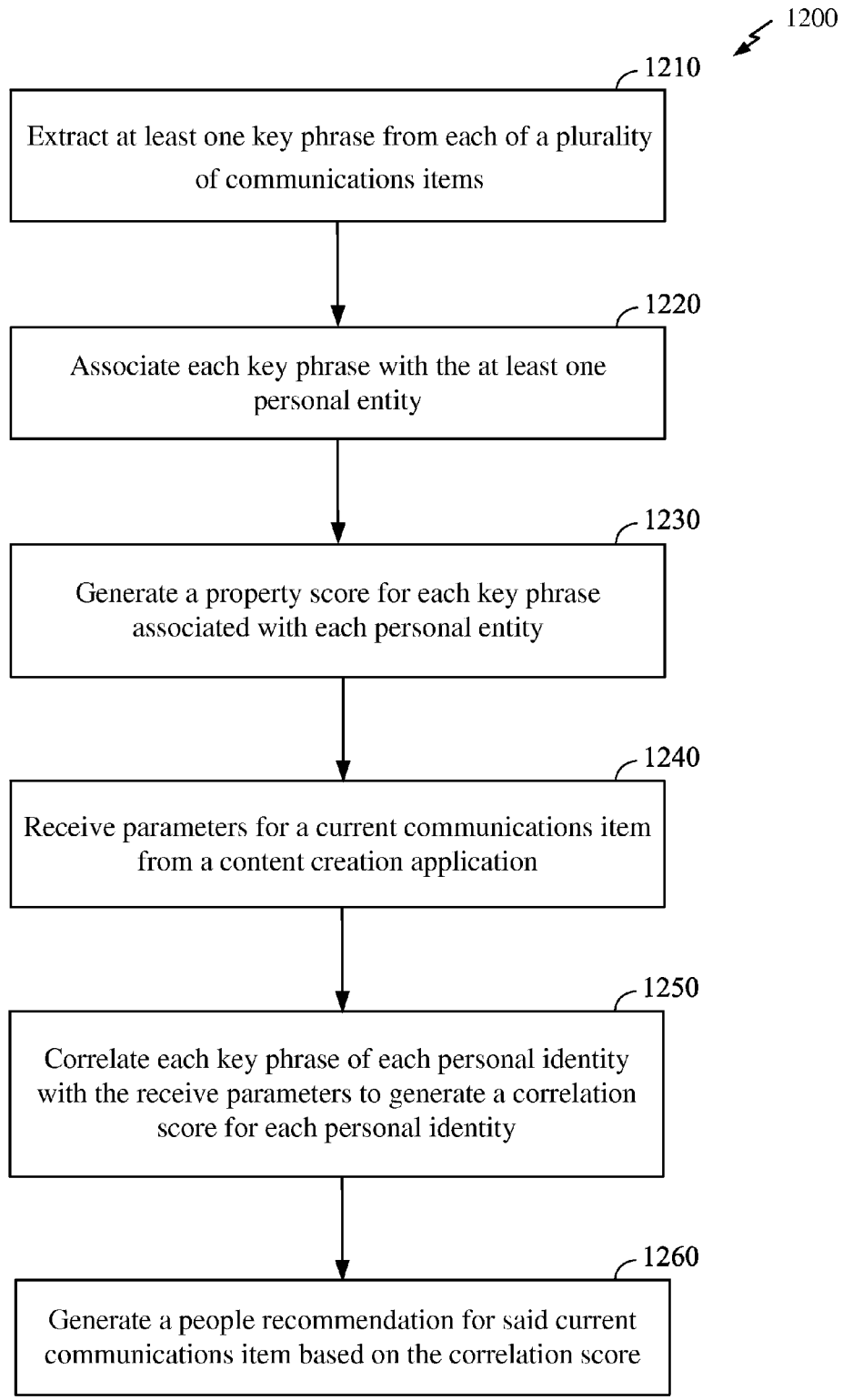
FIG. 12 illustrates an exemplary embodiment of a method according to the present disclosure.

FIG. 12 illustrates an exemplary embodiment of a method 1200 according to the present disclosure. Note FIG. 12 is shown for illustrative purposes only, and is not meant to limit the scope of the present disclosure to any particular method shown.

In FIG. 12, at block 1210, at least one key phrase is extracted from each of a plurality of communications items, each of said items being associated with at least one personal entity.

At block 1220, each key phrase is associated with the at least one personal entity.

At block 1230, a property score is generated for each key phrase associated with each personal entity.

At block 1240, parameters are received for a current communications item from a content creation application.

At block 1250, each key phrase of each personal identity is correlated with the received parameters to generate a correlation score for each personal identity.

At block 1260, a people recommendation is generated for said current communications item based on the correlation score.

Figure 13:
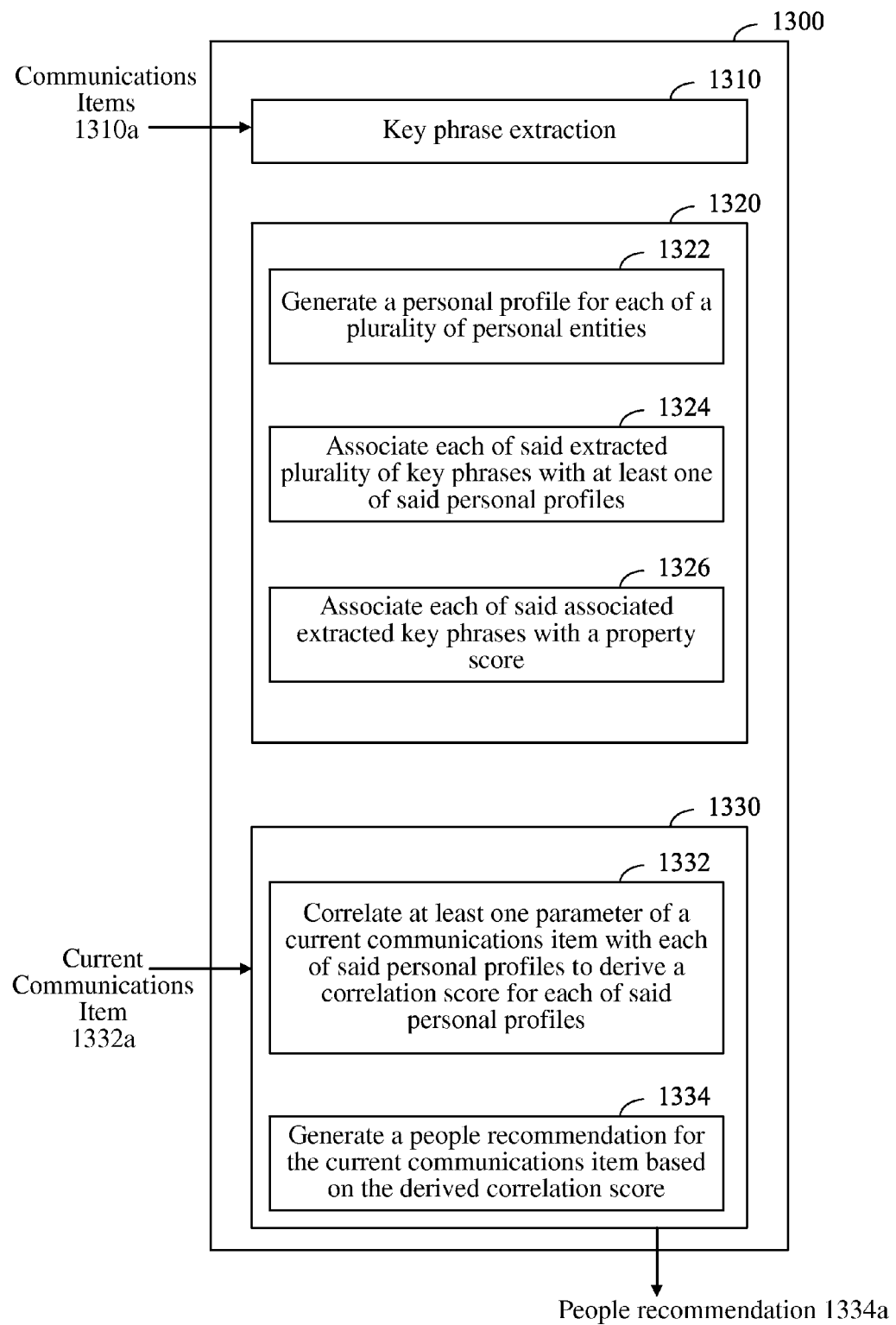
FIG. 13 illustrates an exemplary embodiment of an apparatus according to the present disclosure.

FIG. 13 illustrates an exemplary embodiment 1300 of an apparatus according to the present disclosure. Note FIG. 13 is shown for illustrative purposes only, and is not meant to limit the scope of the present disclosure to any particular apparatus shown.

In FIG. 13, apparatus 1300 comprises a key phrase extraction block 1310 configured to extract a plurality of key phrases from a plurality of communications items 1310*a*. Apparatus 1300 further comprises a personal profile builder 1320 configured to: generate 1322 a personal profile for each of a plurality of personal entities; associate 1324 each of said extracted plurality of key phrases with at least one of said personal profiles; and associate 1326 each of said associated extracted key phrases with a property score. Apparatus 1300 further comprises a recommendation block 1330 configured to correlate 1332 at least one parameter of a current communications item 1332*a* with each of said personal profiles to derive a correlation score for each of said personal profiles. The recommendation block 1330 is further configured to generate a people recommendation 1334*a* for the current communications item 1332*a* based on the derived correlation score.

In an exemplary embodiment, key phrase extraction block 1310 and personal profile builder 1320 may utilize techniques described hereinabove with reference to FIG. 3, and recommendation block 1330 may utilize techniques described hereinabove with reference to first-layer (L1) ranking, e.g., FIG. 8.

Figure 14:
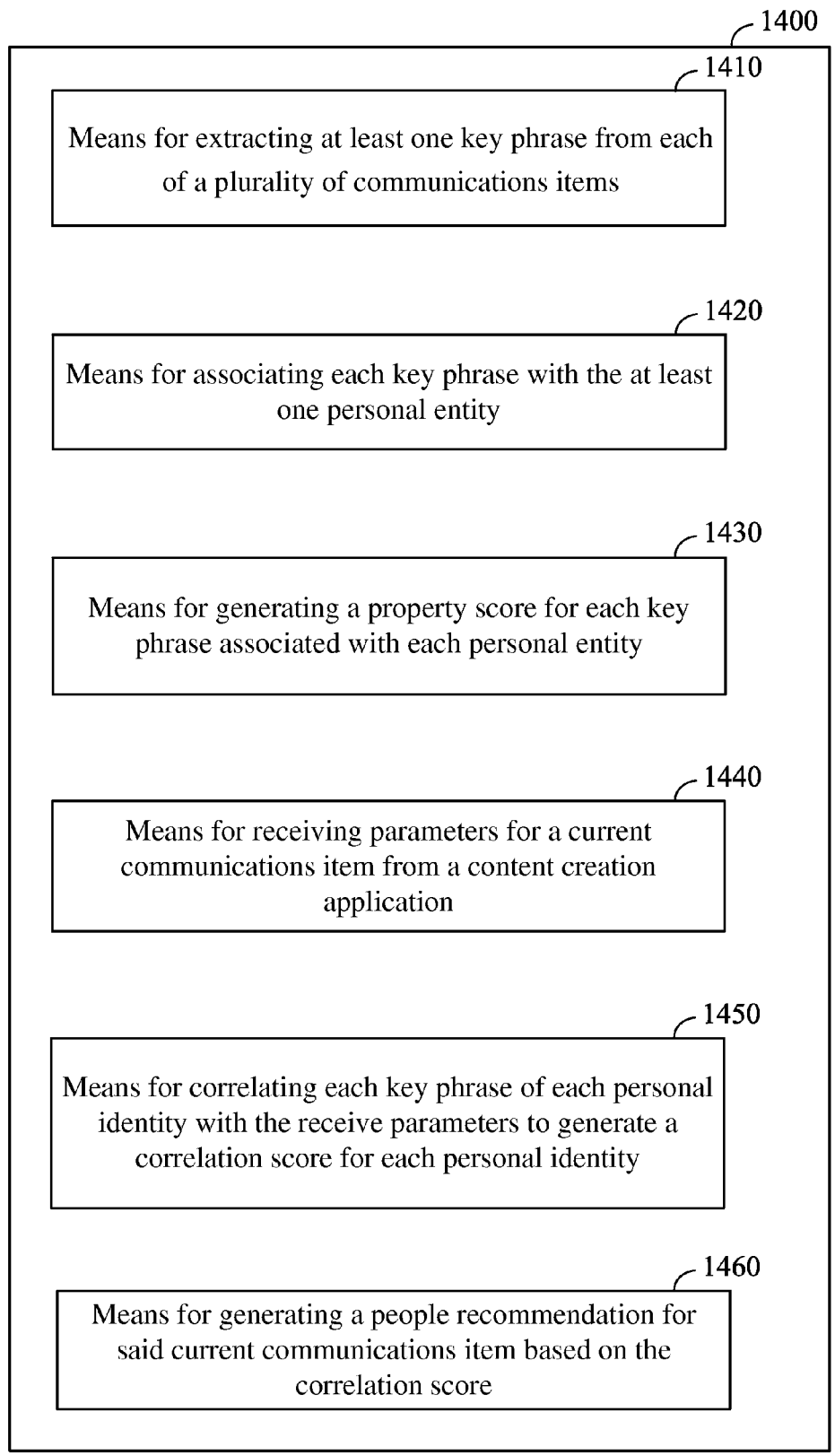
FIG. 14 illustrates an alternative exemplary embodiment of an apparatus according to the present disclosure.

FIG. 14 illustrates an alternative exemplary embodiment 1400 of an apparatus according to the present disclosure. In FIG. 14, apparatus 1400 includes means 1410 for extracting at least one key phrase from each item of a plurality of communications items, each of said items being associated with at least one personal entity; means 1420 for associating each key phrase with the at least one personal entity; means 1430 for generating a property score for each key phrase associated with each personal entity; means 1440 for receiving parameters for a current communications item from a content creation application; means 1450 for correlating each key phrase of each personal identity with the received parameters to generate a correlation score for each personal identity; and means 1460 for generating a people recommendation for said current communications item based on the correlation score.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method for configuring a processor to generate an electronic recommendation for a user of a computer hardware device through a user interface, the method comprising:
   extracting at least one key phrase from each of a plurality of digitally represented communications items, each of said digitally represented communications items and corresponding at least one key phrase being associated with at least one personal entity;
   generating a property score for each of the at least one extracted key phrase;
   receiving parameters for a current communications item from a content creation application;
   correlating the generated property score for each key phrase with the received parameters to generate a correlation score for each personal entity;
   generating a people recommendation for said current communications item based on the correlation score; and
   updating the property score by multiplying with a weight value, wherein the weight value is equal to a number of communications interactions between a user creating the current communications item and a person included in a communications item in which the key phrase appears.

2. The method of claim 1, the generating the people recommendation further comprising:
   identifying a plurality of personal entities having the largest correlation scores; and
   generating a profile score for each of the identified plurality of personal entities;
   the generated people recommendation corresponding to the personal entity having the largest generated profile score.

3. The method of claim 1, the generating the people recommendation further comprising providing a plurality of inputs to a deep semantic similarity model, the plurality of inputs comprising at least one context signal extracted from the received parameters and one or more personal entities having the highest correlation scores.

4. The method of claim 3, the at least one context signal comprising:
   a subject field of the current communications item;
   a body field of the current communications item;
   recipients already specified in the current communications item;
   an identity of the content creation application;
   date or time associated with the current communications item; or
   current location of a user of the content creation application.

5. The method of claim 1, the extracting the at least one key phrase comprising:
   shallow parsing each element of the corpus using a natural language processing (NLP) chunker; or
   deriving one or more word or phrase embeddings using a deep semantic similarity model.

6. The method of claim 1, the generating the property score for each of the at least one extracted key phrase comprising:
   weighting the property score for a key phrase by an indicated importance of the corresponding communications item;
   weighting the property score for a key phrase by an importance of the key phrase to the item; or
   weighting the property score for a key phrase by applying a time decay term to the communications item containing the key phrase.

7. The method of claim 1, the received parameters comprising an explicit user query for people recommendation.

8. The method of claim 1, further comprising displaying the generated people recommendation to a user creating the current communications item through a user interface of the content creation application.

9. The method of claim 2, the generating the profile score further comprising using a machine learning model, the method further comprising:
   receiving an indication from a user accepting or rejecting the generated people recommendation for the current communications item; and
   re-training the machine learning model using the received indication and the received parameters of the current communications item.

10. The method of claim 1, the generating the property score further comprising using a machine learning model, the method further comprising:
    providing a candidate key phrase to a user as a hashtag associated with a personal identity;
    receiving a user rating of a relevance of said hashtag to said personal identity; and
    re-training the machine learning model using the received indication and at least one communications item associated with said personal identity.

11. The method of claim 1, the generating the people recommendation comprising generating said people recommendation in the absence of an explicit request for people recommendation in said received parameters.

12. An apparatus comprising a processor and a memory operatively coupled to the processor, the memory storing instructions causing the processor to implement a plurality of blocks comprising:
- a key phrase extraction block configured to extract a plurality of key phrases from each of a plurality of digitally represented communications items;
- a personal profile builder configured to: generate a personal profile for each of a plurality of personal entities;
- associate each of said extracted plurality of key phrases with at least one of said personal profiles; and
- associate each of said associated extracted key phrases with a property score;

the apparatus further comprising:
- a recommendation block configured to correlate at least one parameter of a current communications item with each of said personal profiles to derive a correlation score for each of said personal profiles,
- the recommendation block further configured to generate a people recommendation for the current communications item based on the derived correlation score, and
- to update the property score by multiplying with a weight value, wherein the weight value is equal to a number of communications interactions between a user creating the current communications item and a person included in a communications item in which the key phrase appears.

13. The apparatus of claim 12, further comprising a second-layer ranking block configured to generate a profile score for each profile of a set of personal profiles having the highest correlation scores, the recommendation block configured to generate the people recommendation by selecting the personal profile having the highest profile score.

14. The apparatus of claim 13, the second-layer ranking block configured to generate the profile score using a deep semantic similarity model supplied with a plurality of inputs comprising at least one context signal extracted from the at least one parameter.

15. The apparatus of claim 14, the at least one context signal comprising:
- a subject field of the current communications item;
- a body field of the current communications item;
- recipients already specified in the current communications item;
- an identity of the content creation application; an application task chosen by a user of the content creation application;
- a previous application task completed by a user of the content creation application;
- date or time associated with the current communications item; or
- current location of a user of the content creation application.

16. The apparatus of claim 12, the key phrase extraction block comprising a sentence breaker coupled to a shallow parser.

17. The apparatus of claim 12, the personal profile builder configured to associate each of said associated extracted key phrases with said property score by:
- weighting the property score for a key phrase by an indicated importance of the corresponding communications item;
- weighting the property score for a key phrase by an importance of the key phrase to the item;
- weighting the property score for a key phrase by applying a time decay term to the communications item containing the key phrase; or
- weighting the property score for a key phrase by a number of communications interactions between a user creating the current communications item and a person included in a communications item in which the key phrase appears.

18. The apparatus of claim 13, the recommendation block further configured to generating the profile score for each profile by using a machine learning model, the recommendation block further configured to:
- receive an indication from a user accepting or rejecting the generated people recommendation for the current communications item; and
- re-train the machine learning model using the received indication and the received parameters of the current communications item.

19. An computer hardware apparatus comprising a processor and memory operatively coupled to the processor, the memory storing instructions operable to cause the processor to implement:
- means for extracting at least one key phrase from each item of a plurality of digitally represented communications items, each of said digitally represented communications items being associated with at least one personal entity;
- means for associating each key phrase with the at least one personal entity;
- means for generating a property score for each key phrase associated with each personal entity;
- means for receiving parameters for a current communications item from a content creation application;
- means for correlating each key phrase of each personal identity with the received parameters to generate a correlation score for each personal identity;
- means for generating a people recommendation for said current communications item based on the correlation score; and
- the means for generating the property score further comprising means for updating the property score for a key phrase by multiplying with a weight value, wherein the weight value is equal to a number of communications interactions between a user creating the current communications item and a person included in a communications item in which the key phrase appears.

20. The apparatus of claim 19, the means for generating the people recommendation further comprising:
- means for identifying a plurality of personal entities having the largest correlation scores; and
- means for generating a profile score for each of the identified plurality of personal entities; the generated people recommendation corresponding to the personal entity having the largest generated profile score.

* * * * *